(12) United States Patent
Maeda (10) Patent No.: US 7,388,800 B2
(45) Date of Patent: Jun. 17, 2008

(54) MEMORY CONTROL DEVICE HAVING LESS POWER CONSUMPTION FOR BACKUP

(75) Inventor: Tadaaki Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 11/179,539

(22) Filed: Jul. 13, 2005

(65) Prior Publication Data

US 2005/0249011 A1    Nov. 10, 2005

Related U.S. Application Data

(62) Division of application No. 10/078,396, filed on Feb. 21, 2002, now Pat. No. 6,981,159.

(30) Foreign Application Priority Data

Feb. 23, 2001    (JP) ............................. 2001-047504

(51) Int. Cl.
*G11C 5/01* (2006.01)
(52) U.S. Cl. ...................... 365/226; 365/227; 365/228; 365/229
(58) Field of Classification Search ................. 365/226, 365/228, 229, 227
See application file for complete search history.

(56) References Cited

U.S. PATENT DOCUMENTS

| 5,640,357 | A | * | 6/1997 | Kakimi | 365/229 |
| 6,058,063 | A | * | 5/2000 | Jang | 365/227 |
| 6,065,124 | A |   | 5/2000 | Lee | 713/323 |
| 6,212,599 | B1 |   | 4/2001 | Baweja et al. | 711/106 |
| 6,317,657 | B1 |   | 11/2001 | George | 700/286 |
| 6,848,058 | B1 |   | 1/2005 | Sinclair et al. | 713/322 |
| 6,874,095 | B2 |   | 3/2005 | Usui | 713/320 |
| 6,981,159 | B2 | * | 12/2005 | Maeda | 713/300 |

* cited by examiner

*Primary Examiner*—Pho M. Luu
(74) *Attorney, Agent, or Firm*—Fitzpatrick, Cella, Harper & Scinto (57) ABSTRACT

When it is detected that the voltage of a main power supply is reduced below a predetermined value during a normal operation, a power controller switches a power supply for a DRAM from the main power supply to a battery power supply and makes an instruction signal for instruction a self-refresh mode to a memory controller active. In response to this, the memory controller changes a clock enable signal for the DRAM to a low level to establish the self-refresh mode of the DRAM, and, after, the self-refresh mode of the DRAM is established, supplying of power to the memory controller is stopped. The clock enable signal for the DRAM is maintained to the low level by pull-down resistance even when the supplying of power to the memory controller is stopped from a condition that the signal is changed to the low level in the self-refresh mode, thereby maintaining the self-refresh mode of the DRAM.

5 Claims, 6 Drawing Sheets

| FIG. 2A | FIG. 2B |

| FIG. 4A | FIG. 4B |

MEMORY CONTROL DEVICE HAVING LESS POWER CONSUMPTION FOR BACKUP

CROSS-REFERENCE TO RELATED APPLICATION

This application is a divisional of application Ser. No. 10/078,396, filed Feb. 21, 2002, now U.S. Pat. No. 6,981,159, the contents of which are incorporated herein by reference.

BACKGROUND OF THE INVENTION

1. Field of the Invention

The present invention relates to a memory control device having a memory controller for controlling an operation of DRAM such as a synchronous dynamic random access memory (SDRAM) and a power controller for controlling a power supply for the memory.

2. Related Background Art

In the past, regarding electronic circuits of a computer, in a system in which an SDRAM must be battery-backed up if supplying power from exterior is interrupted, for example, upon power stoppage, the following procedures have been adopted:

(1) During the power stoppage, power is supplied from a battery to a memory controller itself so as to continue to control an interface to the SDRAM to be backed up; or (2) If the supplying power to the memory controller itself is stopped, a control signal between the memory controller and the SDRAM is switched by a switch, and a controller other than the memory controller controls the SDRAM to be backed up. However, in the above conventional procedure (1), since the battery power is consumed by the memory controller itself, as well as the SDRAM to be backed up, there was a disadvantage that a back-up sustaining time is short. Particularly, in a case where the memory controller is incorporated into a large scale application specific integrated circuit (ASIC), since the battery power is supplied to the entire ASIC, the back-up sustaining time is further shortened.

On the other hand, in the conventional procedure (2), since the power to the memory controller is stopped, although the disadvantage encountered in the procedure (1) can be eliminated, since an additional circuit such as the switch must be provided between the memory controller and the SDRAM, delay in the control signal is caused, with the result that it is very hard to increase operating frequency of the SDRAM. Incidentally, of course, this problem is also encountered in a DRAM, as well as the SDRAM.

SUMMARY OF THE INVENTION

An object of the present invention is to provide a memory control device in which supplying of power to a memory controller is stopped upon battery back-up of a DRAM to reduce power consumption without providing an additional circuit such as a switch between the memory controller and the DRAM, thereby permitting operating frequency to be increased.

According to one aspect, the present invention which achieves the above object relates to a memory control device comprising a memory controller for controlling an operation of a DRAM and for outputting a clock enable signal to the DRAM, a power controller for controlling supplying of power to the DRAM from a main power supply or a back-up battery power supply and for detecting power stoppage of the main power supply, and pull-down resistance for pulling down the clock enable signal to a low level, and wherein, if the power controller detects the power stoppage of the main power supply during a normal operation, the power controller switches a power supply for the DRAM from the main power supply to the battery power supply and instructs a self-refresh mode to the memory controller, so that the memory controller changes the clock enable signal for the DRAM to the low level to establish the self-refresh mode of the DRAM, and, after the DRAM is set to the self-refresh mode, the supplying of power to the memory controller is stopped, and, even after the stoppage, the clock enable signal is maintained to the low level by the pull-down resistance, thereby maintaining the self-refresh mode.

Other objects and advantages besides that discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to claims which follow the description for determining the scope of the invention.

DETAILED DESCRIPTION OF THE PREFERRED EMBODIMENTS

The present invention will now be fully explained in connection with preferred embodiments thereof with reference to the accompanying drawings.

First Embodiment

Figure 1:
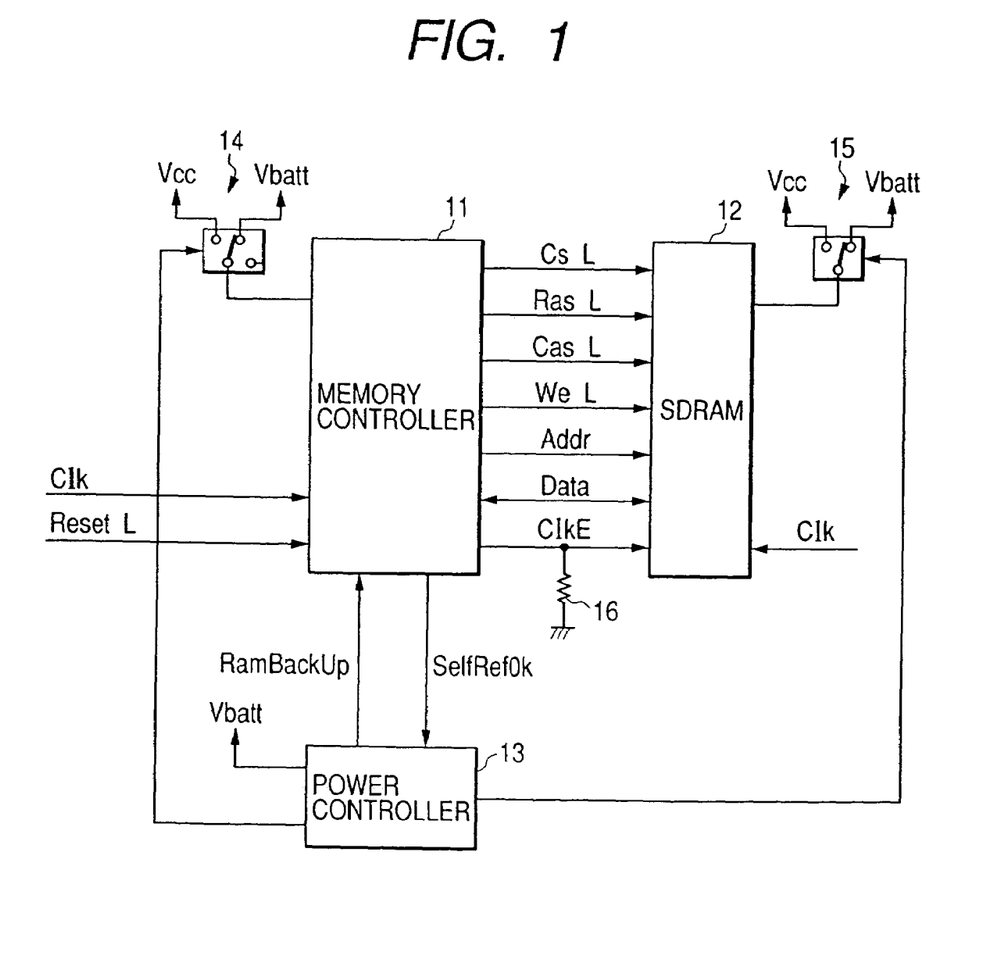
FIG. 1 is a block diagram showing a construction of a memory control device according to a first embodiment of the present invention.

Now, a first embodiment of the present invention will be explained with reference to FIGS. 1, 2A and 2B. FIG. 1 shows a construction of a memory control device according to the first embodiment. The memory control device includes a memory controller 11 and a power controller 13 for a DRAM 12.

In FIG. 1, the memory controller 11 serves to control an operation of a memory (SDRAM 12). The SDRAM 12 is a memory to be controlled. The power controller 13 serves to monitor and control a main power supply Vcc for the memory controller 11 and a battery power supply Vbatt for the SDRAM 12. A switch 14 serves to switch a power supply to the memory controller 11 to either the main power supply Vcc or the battery power supply Vbatt under the control of the power controller 13. A switch 15 serves to switch a power supply to the SDRAM 12 to either the main power supply Vcc or the battery power supply Vbatt under the control of the power controller 13. A pull-down resistance 16 serves to pull-down a clock enable signal ClkE applied to the SDRAM 12 from the memory controller 11. Incidentally, the main power supply Vcc is a DC power supply having predetermined voltage and converted from a home or commercial AV power supply by means of a power supply unit (not shown), and the battery power supply Vbatt is supplied from a back-up battery.

A chip select signal Cs_L, a row address strobe signal Ras_L, a column address strobe signal Cas_L, a write enable signal We_L, an address signal addr and the clock enable signal ClkE are outputted from the memory controller 11 to the SDRAM 12 to control the SDRAM 12. Incidentally, the signals denoted by "_L" are low active signals which become active (effective) at a low level. The signal ClkE is a high active signal. Further, a data signal Data is communicated between the memory controller 11 and the SDRAM 12.

Further, a clock signal Clk is supplied to the memory controller 11 and the SDRAM 12. A system reset signal Reset_L is supplied to the memory controller 11. A signal RamBackUp is a high active signal supplied from the power controller 13 to the memory controller 11 and serves to instruct a self-refresh mode to the memory controller 11 to achieve the self-refresh mode of the SDRAM 12. A signal SelfRefOK is a high active signal supplied from the memory controller 11 to the power controller 13 and serves to inform of the fact that the SDRAM 12 is changed to the self-refresh mode.

Next, an operation of the arrangement shown in FIG. 1 will be explained. First of all, an operation in normal power-up (no back-up) will be described.

When the main power supply Vcc is turned ON, the system reset signal Reset_L is changed to the low level. When the signal Reset_L is in the low level, since the signal RamBackUp is also in the low level, the memory controller 11 holds the signals Cs_L, Ras_L, Cas_L, We_L and ClkE to high levels. When the signal Reset_L is cancelled, since the signal RamBackUp is changed to the low level, power-on initial sequence of the SDRAM 12 is effected (Pre-Charge All command is issued, and thereafter, Auto Refresh Commands are issued by 8 times and Mode Set Command is issued), and, thereafter, normal operation is performed, and, if necessary, read/write of the SDRAM 12 is effected.

Next, an operation in which contents of the SDRAM 12 is backed up by the battery power supply Vbatt upon power stoppage of the main power supply Vcc during the normal operation will be explained.

In FIG. 1, the power controller 13 always monitors voltage of the main power supply Vcc supplied from the power supply unit (not shown) so that, if the voltage of the main power supply Vcc is decreased below predetermined voltage during the normal operation, the power controller changes the signal RamBackUp to active (high level) for the memory controller 11 and instructs to change the SDRAM 12 to the self-refresh mode. At the same time, by switching the switches 14, 15, the power supply to the memory controller 11 and the power supply to the SDRAM 12 are switched from the main power supply Vcc to the battery power supply Vbatt.

When the signal RamBackUp is received, the memory controller 11 immediately changes the signals ClkE, Cs_L, Ras_L and Cas_L to the high levels and issues Self Refresh Entry Command to the SDRAM 12 to establish the self-refresh mode of the SDRAM 12, and the self-refresh Mode is continued by holding the signal ClkE to the low level. Also, at the same time, the signal SelfRefOK is changed to active to inform the power controller 13 of the fact that the SDRAM 12 enters into the self-refresh mode.

When the signal SelfRefOK is received, the power controller 13 returns the power supply of the memory controller 11 from the battery power supply Vbatt to the stopped main power supply Vcc by switching the switch 14. That is to say, the supplying of power from the battery power supply Vbatt to the memory controller 11 is stopped. In this case, although the control signals Cs_L, Ras_L, Cas_L and We_L for the SDRAM 12 outputted from the memory controller 11 become unstable, since the clock enable signal ClkE alone is pulled-down through the pull-down resistance 16, this signal is kept to the low level. Accordingly, the SDRAM 12 maintains the self-refresh mode so that the contents of the SDRAM 12 can continue to be backed up with minimum power consumption so long as the capacity of the battery continues.

Next, explanation will be made with respect to an operation when the operation is returned from the back-up to the normal operation due to restoring of the main power supply Vcc after the power stoppage of the main power supply Vcc.

When the supplying from the main power supply Vcc is restored and the voltage of the main power supply is increased above the predetermined voltage, the power controller 13 detecting such fact switches the power supply of the SDRAM 12 from the battery power supply Vbatt to the main power supply Vcc. The signal RamBackUp to the memory controller 11 is kept to active (high level) until the system reset signal Reset_L, is cancelled. If the signal RamBackUp is in the high level while the signal Reset_L is being in the low level, the memory controller 11 maintains the self-refresh mode of the SDRAM 12 by continuing to keep the clock enable signal ClkE to the low level. After the signal Reset_L is cancelled, if the signal RamBackUp is in the high level, the signal ClkE is changed to the high level to release the self-refresh mode of the SDRAM 12, and the Auto Refresh Command is issued immediately without executing the power on initial sequence. Thereafter, the normal operation is entered, and the read/write of the SDRAM 12 is effected on demand.

Next, further explanation will be made with reference to a timing chart shown in FIGS. 2A and 2B to further facilitate the understanding of the above operation.

Figure 2:
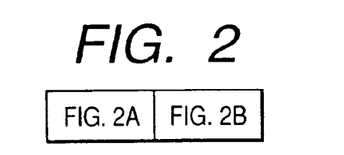
FIG. 2 is comprised of FIGS. 2A and 2B illustrating timing charts showing signals for explaining an operation of the first embodiment.
Figure 2A:
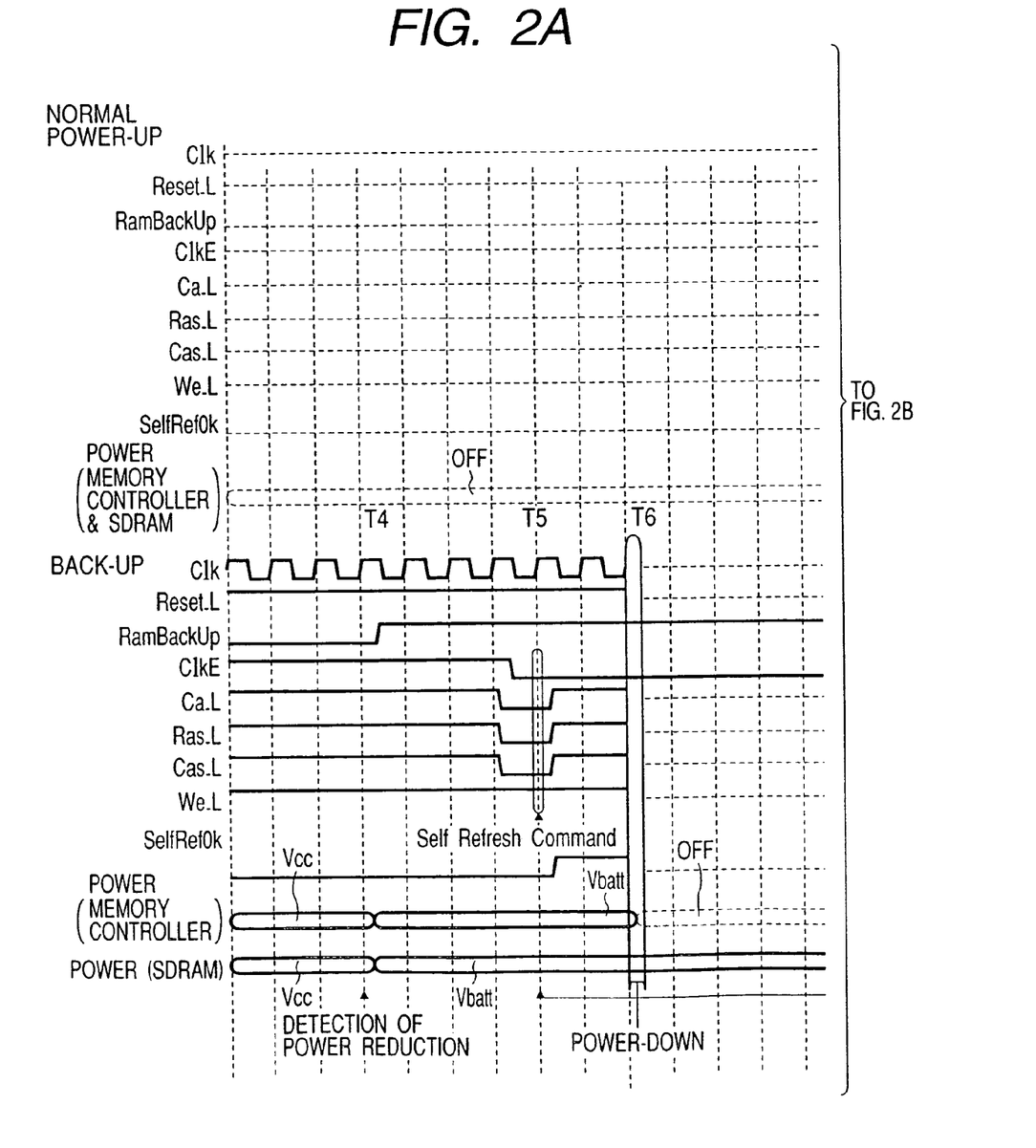
Figure 2B:
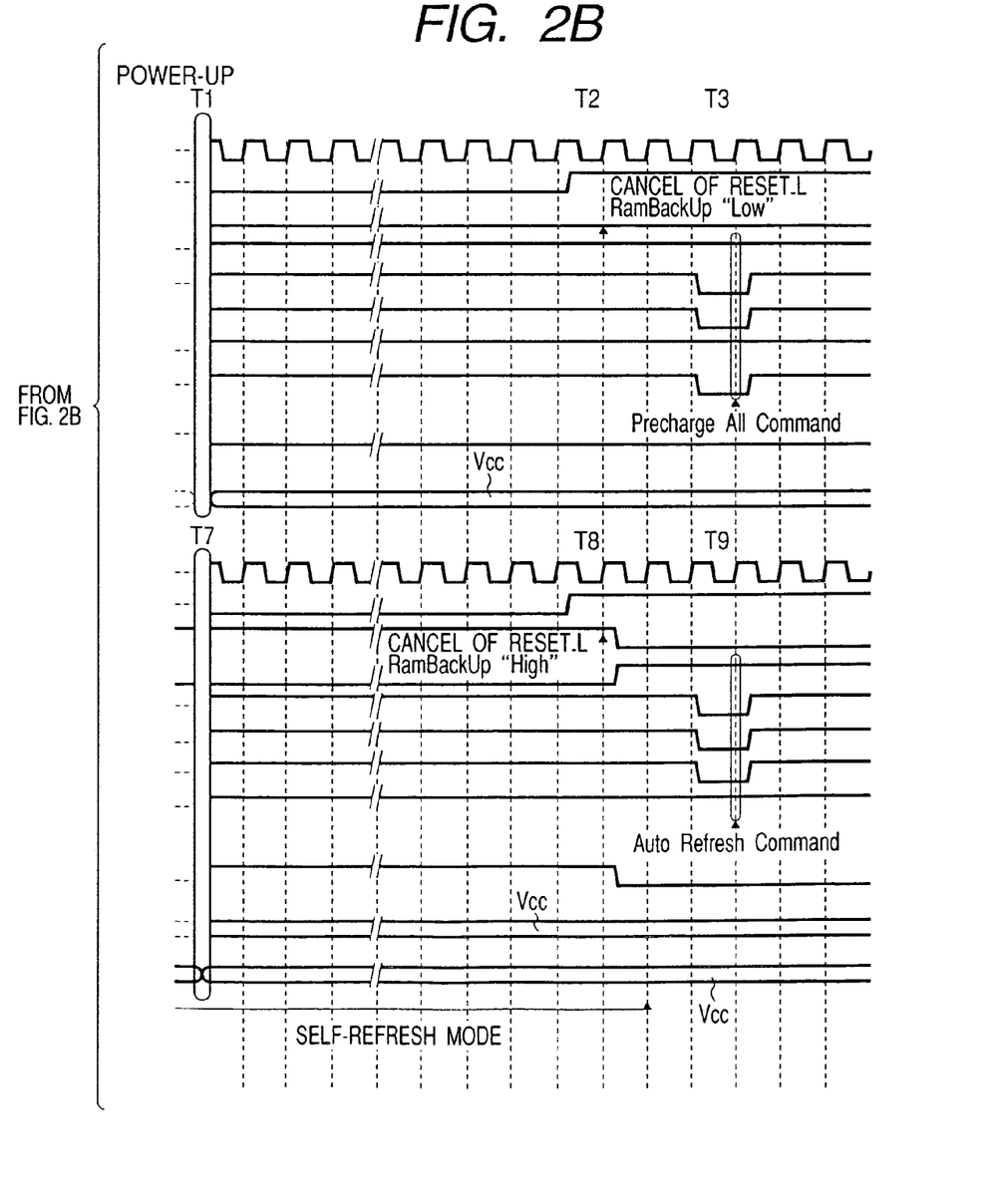

In FIGS. 2A and 2B, an upper half illustrates the normal operation when the main power source is being turned ON, and a lower half illustrates the operation when the main power supply is restored after the power stoppage of the main power supply (battery back-up) from the normal operation.

First of all, the normal operation when the main power source is being turned ON, shown in the upper half in FIGS. 2A and 2B, will be explained. At a time T1, the main power supply Vcc is turned ON. In this case, the system reset signal Reset_L becomes the low level and the signal RamBackUp outputted from the power controller 13 becomes the low level, thereby indicating the fact that a condition is not restored from the back-up condition. Accordingly, the memory controller 11 drives the clock enable signal ClkE to the high level. Thereafter, at a time T2 (cancelling of the signal Reset_L), since the signal RamBackUp is in the low level, the memory controller 11 executes the power-on initial sequence of the SDRAM 12. That is to say, at a time T3, Pre-Charge All Command is issued in the initial stage of the power-on initial sequence. Thereafter, although not shown in FIGS. 2A and 2B, Auto-refresh Commands are issued by 8 times and Mode Set Command is issued to establish a read/write permitting condition.

Next, the operation when the main power supply is restored after the power stoppage of the main power supply (SDRAM back-up) from the normal operation, shown in the lower half in FIGS. 2A and 2B, will be explained. From the normal operation condition, first of all, at a time T4, if the reduction of the voltage of the main power supply Vcc is detected by the power controller 13, the signal RamBackUp for the memory controller is changed to the high level and the instruction for entering the SDRAM 12 into the self-refresh mode is issued.

At the same time, by switching the switches 14, 15, the power supplies of the memory controller 11 and the SDRAM 12 are switched from the main power supply Vcc to the battery power supply Vbatt.

At a time T5, the memory controller 11 issues Self-Refresh Entry Command (if necessary, Pre-Charge All Command/Auto-Refresh Command are issued before the Self-Refresh Entry Command). At the same time, the signal SelfRefOK is changed to the high level, and the fact that the SDRAM 12 enters into the self-refresh mode is informed. And, the signal ClkE is kept to the low level to maintain the self-refresh mode of the SDRAM 12.

When the signal SelfRefOK is received, at a time T6, the power controller 13 returns the power supply of the memory controller 11 from the battery power supply Vbatt to the main power supply Vcc by switching the switch 14. That is to say, the supplying of power from the battery power supply Vbatt to the memory controller 11 is stopped, and only the SDRAM 12 continues to be supplied from the battery power supply Vbatt. In this case, the signal RamBackUp is held to the high level. Further, even when the supplying of power to the memory controller 11 is stopped, since the signal ClkE is held to the low level by the pull-down resistance 16, the SDRAM 12 is maintained to the self-refresh mode.

Thereafter, at a time T7, when the main power supply Vcc is restored, the power controller 13 returns the power supply of the SDRAM 12 from the battery power supply Vbatt to the main power supply Vcc by switching the switch 15. Thus the battery back-up is performed from the time T4 to the time T7.

Here, similar to the normal power-ON of the main power supply shown in the upper half in FIGS. 2A and 2B, although the system reset signal Reset_L is changed to the low level, since the signal RamBackUp is in the high level, the memory controller 11 maintains the signal ClkE to the low level, thereby maintaining the self-refresh mode of the SDRAM 12. At a time T8, although the system reset signal Reset_L is cancelled, since the signal RamBackUp is in the high level, the memory controller 11 does not execute the normal power-on initial sequence, and, at a time T9, Auto-Refresh Command is issued to establish the read/write permitting condition.

As mentioned above, according to the illustrated embodiment, as shown in the lower half in FIGS. 2A and 2B, if the main power supply Vcc is OFF (power stoppage) from the normal power supplying condition (at the time T4), although the power supplies of the memory controller 11 and the SDRAM 12 are switched from the main power supply Vcc to the battery power supply Vbatt, thereafter, after the SDRAM 12 is changed to the self-refresh mode by the memory controller 11 (at the time T5), the power supply of the memory controller 11 is switched from the battery power supply Vbatt to the stopped main power supply Vcc, and the supplying of power to the memory controller 11 is stopped (at the time T6). The supplying of power to the memory controller 11 is stopped until the main power supply Vcc is restored (at the time T7).

Accordingly, power consumption during the battery back-up can be reduced, and thus, more long term battery back-up becomes possible. Further, in a system in which required time for the battery back-up is determined, the desired back-up time can be satisfied by smaller battery capacity, thereby reducing the cost. Further, since it is not required to provide an additional circuit such as a switch between the memory controller 11 and the SDRAM 12, delay in the control signals is minimized, thereby facilitating the enhancement of operating frequency of the SDRAM.

Second Embodiment

Figure 3:
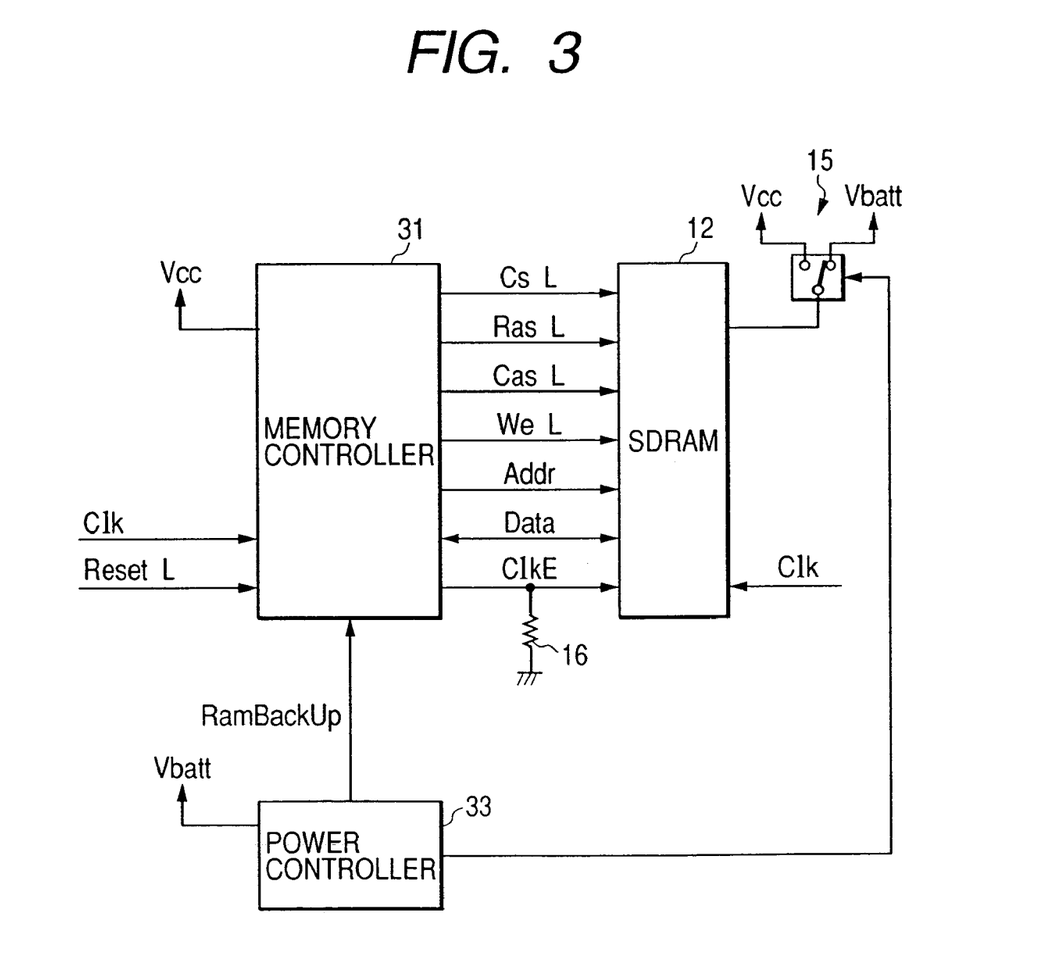
FIG. 3 is a block diagram showing a construction of a memory control device according to a second embodiment of the present invention.

Next, a second embodiment of the present invention will be explained with reference to FIGS. 3, 4A and 4B. FIG. 3 shows a construction of a memory control device according to the second embodiment. In FIG. 3, the same elements as those in the first embodiment (FIG. 1) are designated by the same reference numerals, and explanation thereof will be omitted.

As shown in FIG. 3, in an arrangement according to the second embodiment, the switch 14 in the first embodiment (FIG. 1) is omitted, and the supplying power to a memory controller 31 is performed by the main power supply Vcc alone, and the power supply of the memory controller 31 is not switched. Further, in the first embodiment, although the signal SelfRefOK was outputted from the memory controller 11 to the power controller 13, in the second embodiment, the signal SelfRefOK is not outputted from the memory controller 31 to a power controller 33. The other arrangements according to the second embodiment are the same as those in the first embodiment.

Next, an operation of the second embodiment will be explained with reference to a timing chart shown in FIGS. 4A and 4B. Incidentally, since a normal operation when the main power source is being turned ON shown in the upper half in FIGS. 2A and 2B according to the first embodiment, explanation thereof will be omitted, and an operation when the main power supply is restored after the power stoppage of the main power supply from the normal operation, shown in a lower half in FIGS. 4A and 4B, will be explained.

Figure 4:
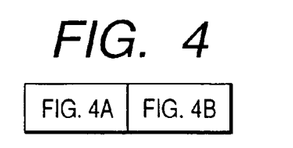
FIG. 4 is comprised of FIGS. 4A and 4B illustrating timing charts showing signals for explaining an operation of the second embodiment.
Figure 4A:
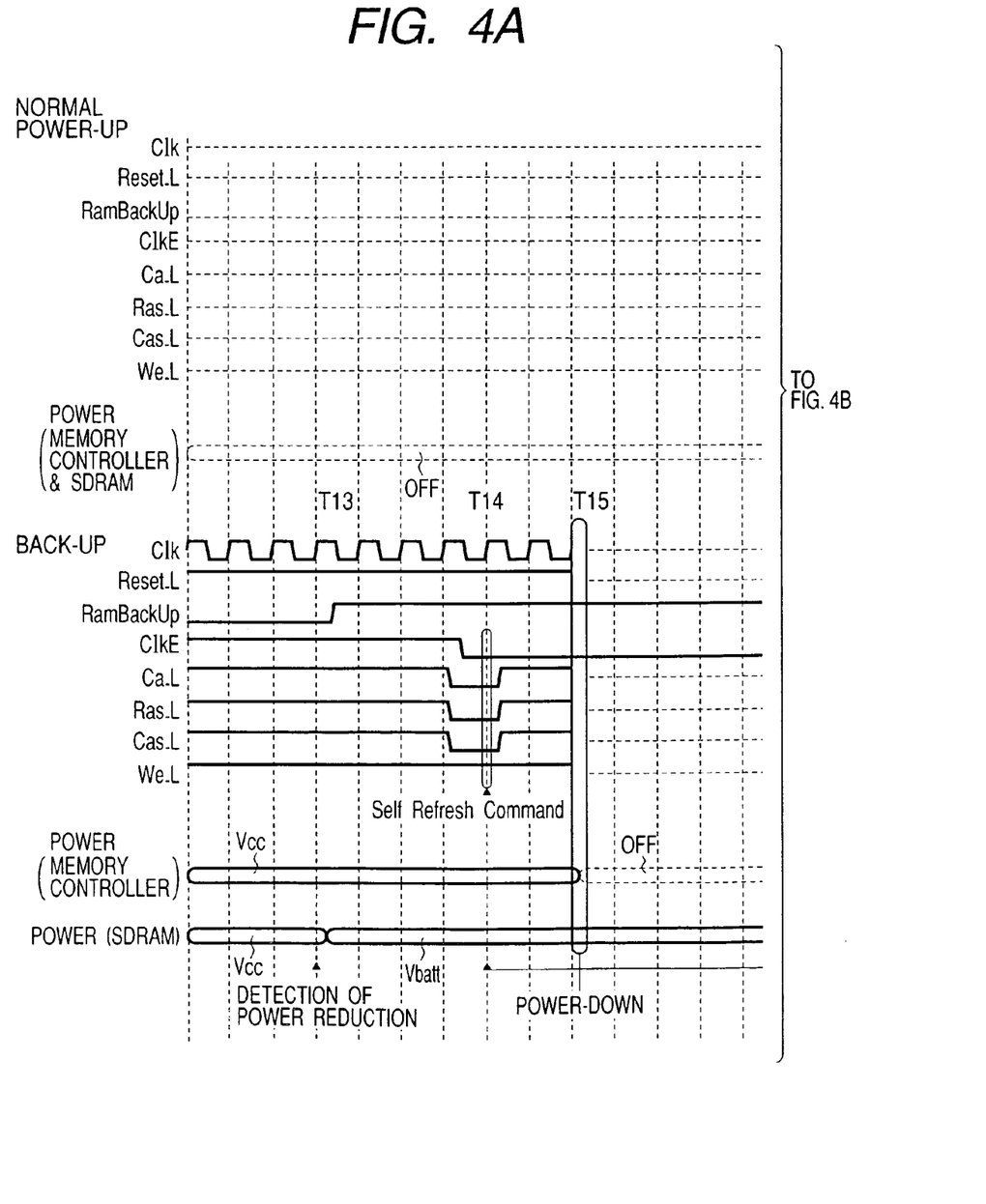
Figure 4B:
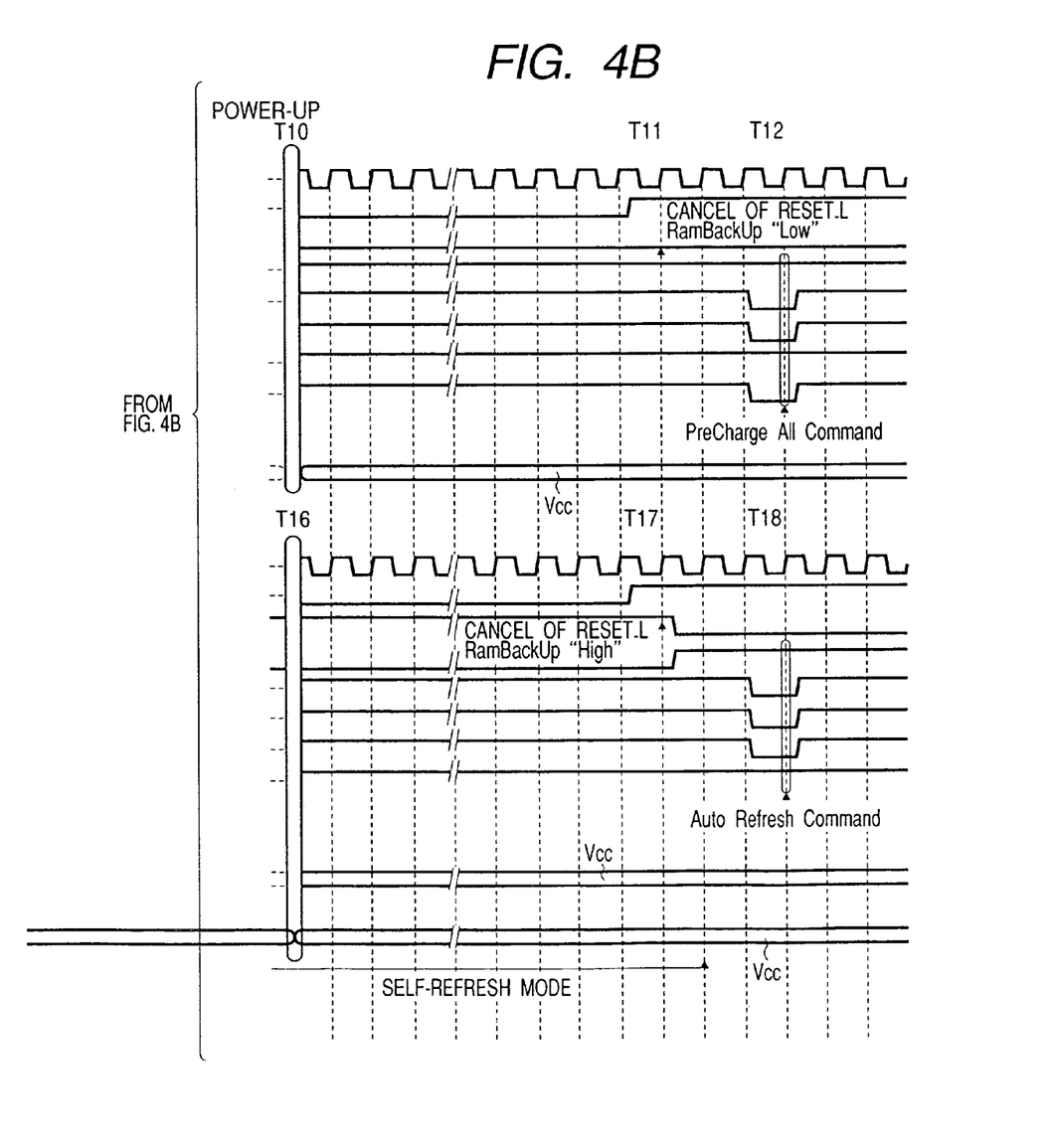

In the first embodiment, while an example that, if the reduction of the voltage of the main power supply Vcc is detected by the power controller 13 at the time T4 in FIGS. 2A and 2B, the power supplies of the memory controller 11 and the SDRAM 12 are switched to the battery power supply Vbatt was explained, in the second embodiment, supplying of power to the memory controller 31 from the main power supply Vcc is ensured from a time point T13 when reduction of voltage of the main power supply Vcc is detected by the power controller 33 in FIGS. 4A and 4B to a subsequent time point T15, and at an intermediate time point T14, the memory controller 31 changes the clock enable signal ClkE to the low level and issues Self-Refresh Entry Command, thereby establishing the self-refresh mode of the SDRAM 12. Subsequent operations are the same as those in the first embodiment.

According to the second embodiment, since the supplying of power to the memory controller 31 from the main power supply Vcc is ensured from the time point T13 to the time point T15, meanwhile, the power supply of the memory controller 31 is not required to be switched to the battery power supply Vbatt. Further, the signal SelfRefOK signal for determining a timing of the switching can be eliminated.

Incidentally, in the second embodiment, although the supplying of power to the memory controller 31 is stopped from the time point T15 to a time point T16 when the main power supply Vcc is restored, meanwhile, since the signal ClkE is kept to the low level by the pull-down resistance 16, the SDRAM 12 is maintained to the self-refresh mode, thereby effecting the battery back-up.

According to such a second embodiment, when the battery back-up of the SDRAM 12 is effected after the power stoppage of the main power supply from the normal power supplying condition, since the supplying of power to the memory controller 31 from the battery power supply Vbatt is not effected at all, current consumption during the battery back-up can be further reduced in comparison with the first embodiment.

Incidentally, it should be noted that the constructions of the memory control devices shown in the first and second embodiments can be applied to a memory control device comprising a memory controller and a power controller for a DRAM other than the SDRAM.

According to the above-mentioned embodiments, in the memory control device having the memory controller and power controller for the DRAM, upon the back-up of the DRAM in response to the power stoppage of the main power supply, since the supplying of power to the memory controller can be stopped, the current consumption during the battery back-up can be reduced, thereby permitting longer tern battery back-up. Further, in a system in which the required time of the battery back-up is determined, the desired back-up time can be satisfied by smaller battery capacity, thereby reducing the cost. Further, since it is not required to provide an additional circuit such as a switch between the memory controller and the DRAM, delay in the control signal is minimized, thereby facilitating enhancement of operating frequency of the DRAM.

Although the present invention has been described in its preferred forms with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A memory control device comprising:
   a memory controller for controlling an operation of a DRAM and for directly outputting a clock enable signal to said DRAM without any intervening switches;
   a power controller for controlling supply of power to said DRAM from a main power supply or a back-up battery power supply and for monitoring the voltage of said main power supply; and
   pull-down resistance for pulling down the clock enable signal to low level; wherein
   if said power controller detects that the voltage of said main power supply is reduced below a predetermined value during a normal operation, said power controller is configured to switch a power supply for said DRAM from said main power supply to said battery power supply and to instruct a self-refresh mode to said memory controller, so that said memory controller changes the clock enable signal for said DRAM to the low level to establish the self-refresh mode of said DRAM, and
   wherein said power controller is further configured to stop the supply of power to said memory controller after said DRAM is set to the self-refresh mode, and, even after the supply of power to said memory controller has been stopped, the clock enable signal is maintained to the low level by said pull-down resistance, thereby maintaining the self-refresh mode.

2. A memory control device according to claim 1, wherein, if said power controller detects that the voltage of said main power supply is reduced below the predetermined value during the normal operation, said power controller is configured to switch a power supply for said memory controller from said main power supply to said battery power supply, and, after the self-refresh mode of said DRAM is established by said memory controller, to stop the supply of power to said memory controller from said battery power supply.

3. A memory control device according to claim 1, wherein power is supplied to said memory controller only by said main power supply, and, if the voltage of said main power supply is reduced below the predetermined value during the normal operation, the power is supplied to said memory controller from said main power supply until the self-refresh mode of said DRAM is established by said memory controller.

4. A memory control device according to claim 1, wherein, if said power controller detects that the voltage of said main power supply is reduced below the predetermined value during the normal operation, said power controller instructs the self-refresh mode by changing an instruction signal for instructing the self-refresh mode to said memory controller to active.

5. A memory control device according to claim 1, wherein, if said power controller detects that the voltage of said main power supply is reduced below the predetermined value during the normal operation, said power controller maintains an active state on an instruction signal for the self-refresh mode until immediately after said main power supply is restored and after a system reset is cancelled after the instruction signal was made active, and
   said memory controller maintains the clock enable signal to the low level while the instruction signal is active upon restoring of said main power supply, thereby maintaining the self-refresh mode of said DRAM.

* * * * *